United States Patent [19]

Sankey et al.

[11] Patent Number: 4,706,847

[45] Date of Patent: Nov. 17, 1987

[54] DISPENSER FOR WINE

[75] Inventors: Brian Sankey, Winchester; Douglas Sankey, Chesterfield, both of Mo.

[73] Assignee: Senmar Corporation, Ballwin, Mo.

[21] Appl. No.: 859,429

[22] Filed: May 5, 1986

[51] Int. Cl.[4] .......................... B67D 1/08; F16K 51/00

[52] U.S. Cl. ........................................ 222/1; 222/152; 222/399; 222/400.7; 137/329.4; 137/614.04

[58] Field of Search .................... 222/1, 132, 136, 152, 222/394, 396, 399, 400.7, 478–479, 481–482, 501, 180–181, 185, 386.5; 215/231; 137/212, 329.4, 614.04, 614.2, 846

[56] References Cited

U.S. PATENT DOCUMENTS

| | | | |
|---|---|---|---|
| 2,321,836 | 6/1943 | Marzo | 222/386.5 |
| 3,653,557 | 4/1972 | Lamb | 222/400.7 |
| 3,802,606 | 4/1974 | Gust | 222/181 |
| 3,883,043 | 5/1975 | Lane | 222/82 |
| 3,905,522 | 9/1975 | Johnston | 222/400.7 |
| 4,089,444 | 5/1978 | Shea | 137/212 X |
| 4,350,273 | 9/1982 | Nezworski et al. | 222/400.7 X |
| 4,392,578 | 7/1983 | Fipp et al. | 215/23 |
| 4,473,174 | 9/1984 | Heuser | 222/152 |
| 4,595,121 | 6/1986 | Schultz | 222/1 |

FOREIGN PATENT DOCUMENTS

| | | | |
|---|---|---|---|
| 2532718 | 4/1976 | Fed. Rep. of Germany | 137/212 |

OTHER PUBLICATIONS

Mulzet et al., IBM Technical Disclosure Bulletin, vol. 19, No. 1, Jun. 1976.

*Primary Examiner*—Joseph J. Rolla
*Assistant Examiner*—Michael S. Huppert
*Attorney, Agent, or Firm*—Kinzer, Plyer, Dorn, McEachran & Jambor

[57] ABSTRACT

A wine dispensing mechanism for dispensing individual portions of wine from a bottle while protecting the remaining wine in the bottle against the deleterious effects of air. The dispenser uses a source of low pressure inert gas for a number of bottles of wine through the use of a plug which is inserted in the neck of the wine bottle in place of the cork. The plug has a gas inlet and a wine outlet with self-closing valves in each. A coupler which is easily connected to and disconnected from the plug is connected to a source of inert gas and a wine dispensing tap. The coupler has separate wine and gas passages with a self-closing valve in the gas passage. The plug and coupler can only be connected with the gas and wine passages properly aligned and the self-closing valves in each are automatically opened when they are connected, and closed when disconnected.

4 Claims, 5 Drawing Figures

Fig. 1.
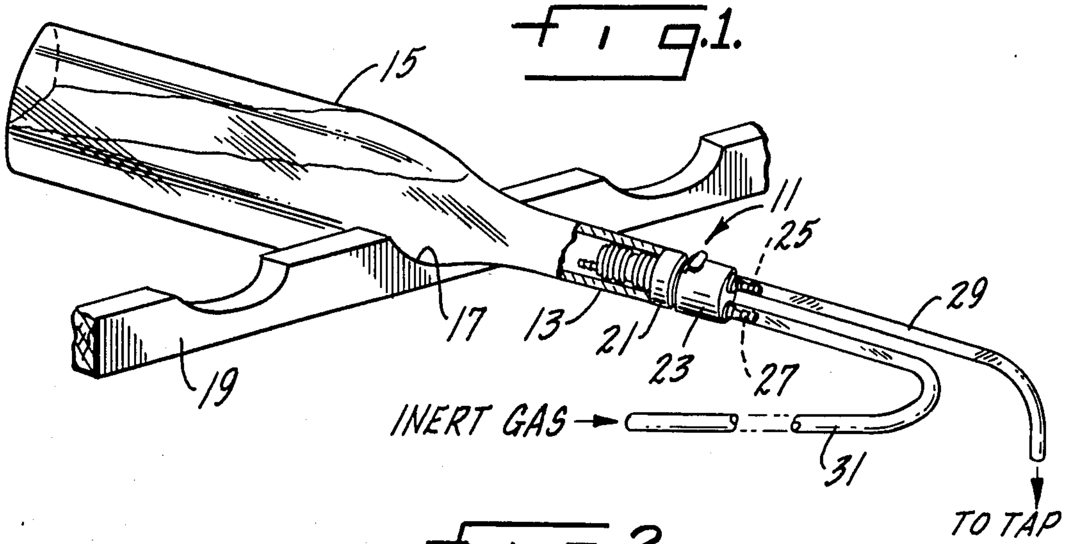
Fig. 2.
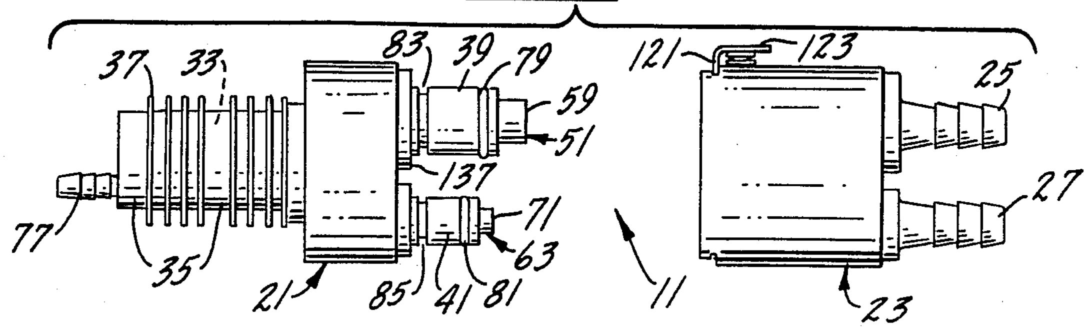
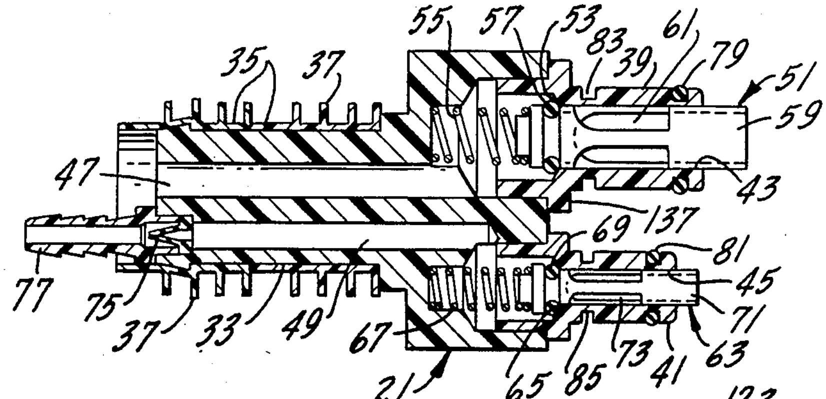
Fig. 3.
Fig. 5.
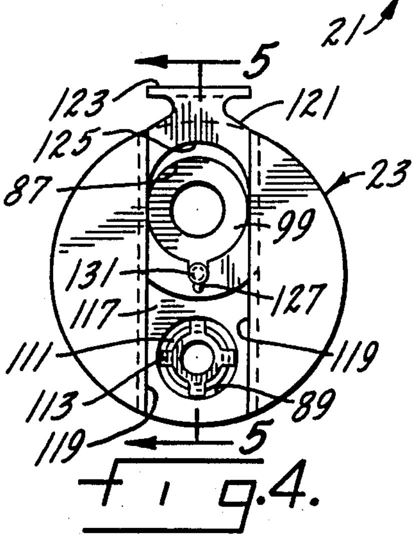
Fig. 4.
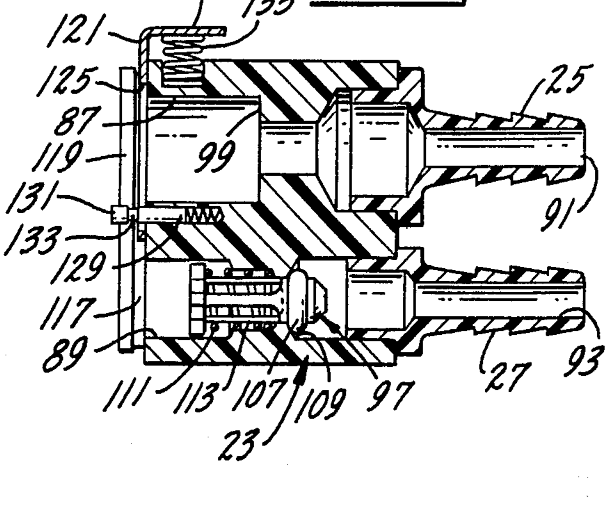

DISPENSER FOR WINE

BACKGROUND AND SUMMARY OF THE INVENTION

This invention is directed to a dispenser for wine which permits a bottle to be opened and served in individual portions over an extended period of time without subjecting the remaining wine in the bottle to the deleterious effects of air. It is becoming more popular for restaurants and wine bars to offer high quality wines in individual servings. However, this manner of serving wine requires that the remaining wine in the bottle be protected against the harmful effects of contact with air. Over the years, many devices have been proposed to perform this fuction but most have had serious drawbacks and have not experienced widespread commercial success.

An object of this invention is a dispenser for a wine bottle which replaces the cork in the bottle and permits the use of low pressure gas, such as nitrogen or argon, to discharge the wine to a dispensing tap.

Another object of this invention is a dispensing apparatus for a wine bottle which permits the use of a single dispensing tap and a single source of pressurized gas for a number of different bottles of wine.

Another object of this invention is a dispensing apparatus for wine bottles which permits the wine to be discharged from the wine bottles while they are stored on their sides in conventional wine racks.

Another object of this invention is a method of utilizing gravity and a low pressure inert gas to supply wine from a bottle to a dispensing tap.

Another object of this invention is a seal that utilizes flexible radial fins to hold the plug in the neck of the bottle.

Other objects of the invention may be found in the following specification, claims and drawings.

BRIEF DESCRIPTION OF THE DRAWINGS

The invention is illustrated more or less diagrammatically in the following drawings wherein FIG. 1 is a perspective view, partially in cross section, showing the wine dispensing mechanism of this invention installed in a bottle of wine supported on a wine rack;

FIG. 2 is an exploded side elevational view of the wine dispensing mechanism of this invention shown disconnected;

FIG. 3 is an enlarged axial cross sectional view taken through the plug portion of the wine dispensing mechanism of this invention;

FIG. 4 is an enlarged end elevational view of the coupler portion of the wine dispensing mechanism of this invention; and FIG. 5 is a cross sectional view taken along line 5—5 of FIG. 4.

DESCRIPTION OF THE PREFERRED EMBODIMENT

FIG. 1 of the drawings shows the wine dispensing mechanism 11 of this invention installed in the neck 13 of a wine bottle 15 which is supported in a notch 17 in a wine rack 19 so that the neck of the bottle is tilted somewhat downwardly from the horizontal to assure the wine fills the neck of the bottle.

As shown in FIG. 1, the wine dispensing mechanism 11 includes a plug 21 which is inserted in the neck of the bottle to replace the normal wine cork, and a detachable coupler 23 having hose barbs 25 and 27 which attach to plastic hoses 29 and 31 which are connected respectively to a tap for dispensing the wine, which is not shown, and a source of low pressure inert gas, preferably nitrogen or argon, which also is not shown.

FIG. 2 of the drawings shows the plug 21 and the coupler 23 of the wine dispensing mechanism in their separated positions. In their separated positions, the plug 21 remains in the neck of the bottle, sealing the wine bottle 15 against the deleterious effects of air and preventing leakage of the wine from the bottle. The plug 21 includes a tubular portion 33 which extends into the neck of the wine bottle. A sleeve or sleeves 35 tightly fit over this tubular portion and these sleeves have fins 37 integrally formed therewith. The fins function to form a seal between the tubular portion 33 of the plug and the neck of the wine bottle. Extending from the opposite end of the plug 21 are a pair of cylindrical tubular projections 39 and 41, with the tubular projection 39 having a larger diameter and being slightly longer than the tubular projection 41.

As can best be seen in the cross sectional view of FIG. 3, the cylindrical tubular projections 39 and 41, respectively, enclose an outlet 43 for the wine and an inlet 45 for gas. The wine outlet 43 is part of a passage 47 extending through the plug, while the gas inlet 45 is part of a passage 49 also extending through the plug in a direction generally parallel to the passage 47. The wine passage 47 is normally closed by a valve 51 which is biased against an annular seat 53 by a spring 55. The valve 51 includes an O-ring 57 which engages the annular seat and a tubular portion 59 which extends outwardly of the outlet 43. The tubular portion has cutaway sections 61 adjacent the O-ring to permit flow through the tubular portion and into the passage 47 when the valve is unseated.

The gas passage 49 has a similar normally closed valve 63 which is biased against an annular seat 65 by a spring 67. An O-ring 69 is mounted on the valve and it engages the annular seat. The valve has a tubular portion 71 which extends out beyond the tubular projection 41. The tubular portion 71 has cutaway sections 73 which allow the gas to flow into the passage 49 when the O-ring 69 is moved off the annular seat 65.

A duckbill check valve 75 is installed in the passage 49 at the inner end thereof to prevent wine from backing into the passage 49. A tubular extension 77 is attached to the end of the passage 49 to extend this passage and prevent the gas, which will be discharged from the passage, from immediately entering the wine passage 47.

The tubular cylindrical projections 39 and 41 are each equipped with two annular grooves. The forward annular groove receives O-rings 79 and 81, respectively, while the rear annular grooves 83 and 85, respectively, are locking grooves.

The coupler 23 shown in FIGS. 2, 4 and 5 is cylindrical in cross section and has a pair of cylindrical recesses 87 and 89 formed in the face thereof opposite to the face having the hose barbs 25 and 27. As can be seen in the drawings, the cylindrical recess 87 is complementary in shape and designed to receive the cylindrical projection 39, while the cylindrical recess 89 is complementary in shape to and designed to receive the cylindrical projection 41 of the plug 21. The recesses 87 and 89, respectively, form parts of wine passage 91 which extends through the hose barb 25 and gas passage 93 which extends through the hose barb 27.

Wine passage 91 is unobstructed, while the gas passage 93 is closed by a self-closing valve 97. A shoulder 99 at the base of the recess 87 engages the tubular portion 59 of the tubular projection 39 of the plug 21 when the plug and coupler are connected to unseat the valve 51 and permit the flow of wine through the wine passage 91.

The self-closing gas valve 97 includes an O-ring 107 which engages an annular seat 109 and is biased against the seat by a spring 111. The spring 111 surrounds a skeleton-like plunger 113 which engages the tubular portion 71 of cylindrical projection 41 of the plug 21 to open the gas valve 63 of the plug when the plug is engaged with the coupler.

A shallow rectangular groove 117 with undercut edges 119 is formed in the end of the coupler 23 at the cylindrical recesses 87 and 89. A locking plate 121 rides in the groove 117 and is formed with an integral bent over tab 123 extending along the side of the coupler. The locking plate has a somewhat elliptical opening 125 formed therein which can be aligned with the opening into the cylindrical recess 87 in the coupler. A somewhat tapered groove 127 is formed in the locking plate at the bottom thereof as viewed in FIG. 4. The tapered groove receives a spring biased locking pin 129 with an enlarged head 131 and a narrower groove 133 located next to the head. When the head is pushed in, the tapered groove 127 of the locking part engages the groove 133 and the pin and the locking plate is moved outwardly by means of its spring 135. When the locking plate moves outwardly, it can engage the locking groove 83 and the cylindrical tubular projection 39 of the plug 21 to lock the plug to the coupler.

THE USE, OPERATION AND FUNCTION OF THIS INVENTION ARE AS FOLLOWS:

In order to utilize this invention, the cork is removed from the neck 13 of a wine bottle and the plug 21 of this invention is installed in the bottle. The plug is then inserted into the coupler 23 by aligning the cylindrical tubular projections 39 and 41 on the plug with their matching cylindrical recesses 87 and 89. Because of the differences in diameters of the projections and their recesses, the plug can only be coupled to the coupler in the proper alignment. As the plug 21 is inserted into the coupler 23, the tubular portions 59 and 71 of the valves 51 and 63, which project beyond the cylidrical tubular projections 39 and 41, engage the shoulder 99 and skeleton plunger 113 of the coupler respectively, thereby opening the wine valve 51 and gas valve 63 of the plug and the gas valve 97 of the coupler. This establishes communication between the wine tap, the bottle and the source of low pressure gas, preferably nitrogen or argon, which is introduced into the wine bottle. Through use of a conventional pressure regulator (not shown) on the gas supply, the gas pressure in the bottle is maintained at two or three pounds per square inch. When the cylindrical tubular projections 39 and 41 of the plug are fully seated in the recesses 87 and 89 of the coupler, the head 131 of the spring pin 129 engages a shoulder 137 on the plug, thereby depressing the spring pin against its spring and allowing the locking ring to move outwardly where it locks into the groove 83 of the cylindrical tubular projection 39, thereby locking the plug to the coupler. Gas can pass through the tube 31, through the passage 49 and into the wine bottle where it will assist in discharging the wine through the hose 29 to the tap whenever the tap is opened. The duckbill check valve 75 prevents wine from backing into the gas passage 49. The extension 77 of the gas passage 49 prevents the gas from percolating and going directly into the wine outlet 47. Instead, the gas gathers at the uppermost end of the wine bottle where it acts against the surface of the wine.

The coupler 23 can be disconnected from the wine bottle if it is desired to hook up the gas and tap to a different bottle. This is easily accomplished by pushing down on the bent over tab 123 of the locking plate. Downward movement of the tab 123 disconnects the locking ring from the groove 83 of the plug and permits the spring pin 129 to move outwardly to hold the locking plate in its unlocked position. The coupler can then be pulled away from the plug 21 which remains in the bottle. When the coupler is disconnected from the plug, the spring biased valves 51 and 63 of the plug will move to the closed positions, thereby trapping the inert gas in the bottle and preventing air from getting into the bottle. The coupler 23 can then be taken to another bottle of wine and connected up to a plug installed in that bottle in the manner previously described in the specification.

The plug and coupler are made of a chemical resistant plastic such as acetal thermoplastic which is sold under the trademark "DELRIN". The locking plate 121, locking pin 129 and springs are preferably made of stainless steel. The O-rings are preferably made of Buna N rubber.

We claim:

1. The combination of a wine dispensing mechanism coupled to a bottle of wine lying in on its side on a support with the neck of the bottle in a downwardly inclined position to dispense the contents by the combined effect of gravity and low pressure gas while protecting the remaining contents of the bottle against the deleterious effects of air, and utilizing a single source of low pressure inert gas for a number of bottles of wine, the mechanism attached to the inclined bottle so supported including:
   - a plug which is inserted in the neck of the wine bottle to replace the cork,
   - said plug being equipped with a gas inlet having an inner end and a wine outlet having an inner end, both inner ends being located inside the neck of the inclined bottle and restricted thereto, and having self-closing valves in the inlet and the outlet,
   - a coupler connected to a wine dispensing tap and a source of low pressure gas,
   - said couplier having separate gas and wine passages formed therein with a self-closing valve positioned in the gas passage,
   - means associated with the plug and coupler to permit them to be connected only with the gas inlet of the plug connected with the gas passage in the coupler and the wine outlet in the plug connected with the wine passage in the coupler,
   - means to automatically open the self-closing valves in the plug and coupler upon connecting of the plug and coupler,
   - the gas inlet including a gas passage extending through the plug with a check valve located in the gas passage to prevent wine from entering the gas passage, and in which the check valve communicates with an extension of the gas passage, which extension is presented by a tubular member which extends into the neck of the bottle beyond the inner end of the wine outlet thereby to limit gas percolating into the wine outlet.

2. The combination according to claim 1 in which the check valve is a duckbill valve.

3. The combination according to claim 2 in which the duckbill valve is installed in the outer end of the tubular member which presents the extension of the gas passage, said tubular member being attached at its outer end to the portion of the plug having the gas inlet passage.

4. A method of dispensing individual portions of wine from a bottle while protecting the remaining wine in the bottle against the deleterious effects of air, including the steps of:

removing the cork from the wine bottle and inserting a plug in place thereof with the plug having a gas inlet and wine outlet each having an inner end opening into communication with the interior of the neck of the bottle so supported, each of the gas inlet and the wine outlet having a self-closing valve therein, supporting the wine bottle on its side with the bottom of the bottle slightly elevated to induce gravity flow of wine from the bottle, connecting a coupler to the plug with the coupler having a gas passage connected to a source of low pressure inert gas and a wine passage connected to a dispensing tap for the wine with the passages of the coupler aligned respectively with the gas inlet and wine outlet of the plug and opening the self-closing valves of the inlet and outlet upon connection of the coupler to the plug, withdrawing an individual portion of wine under the combined influence of the gas pressure in the bottle and gravity while permitting additional gas to flow into the bottle to replace the portion of wine being dispensed, disconnecting the coupler from the plug and applying the disconnected coupler to an identical plug of a different bottle of wine while leaving the plug in the bottle of wine from which the coupler was disconnected to protect that bottle of wine against the deleterious effects of air and attaching to the plug a member presenting an extension of the gas passage, which member has an inner end extending beyond the inner end of the wine outlet inside the neck of the bottle thereby to limit gas percolating into the wine outlet.

* * * * *